(12) United States Patent
Koyama et al.

(10) Patent No.: US 9,404,530 B2
(45) Date of Patent: Aug. 2, 2016

(54) BEARING CUP AND CROSS SHAFT JOINT

(71) Applicants: JTEKT CORPORATION, Osaka-shi, Osaka (JP); Koyo Machine Industries Co., Ltd., Yao-shi, Osaka (JP)

(72) Inventors: Takeshi Koyama, Neyagawa (JP); Masanori Kobayashi, Kitakatsuragi-gun (JP); Hirotsugu Kusano, Kashihara (JP); Kenichi Hashimoto, Oume (JP); Hiroshi Kobayashi, Hachioji (JP)

(73) Assignees: JTEKT CORPORATION, Osaka (JP); KOYO MACHINE INDUSTRIES CO., LTD., Yao (JP)

( * ) Notice: Subject to any disclaimer, the term of this patent is extended or adjusted under 35 U.S.C. 154(b) by 16 days.

(21) Appl. No.: 14/306,758

(22) Filed: Jun. 17, 2014

(65) Prior Publication Data

US 2014/0370994 A1 Dec. 18, 2014

(30) Foreign Application Priority Data

Jun. 18, 2013 (JP) ................................. 2013-127706

(51) Int. Cl.
*F16D 3/41* (2006.01)
*F16C 19/22* (2006.01)
*F16D 3/38* (2006.01)

(52) U.S. Cl.
CPC ................. *F16C 19/22* (2013.01); *F16D 3/385* (2013.01); *F16D 3/41* (2013.01)

(58) Field of Classification Search
CPC ............ F16C 19/22; F16D 3/41; F16D 3/385
USPC ...................... 464/128, 130, 132; 29/898.062, 29/898.063, 898.066, 898.07, DIG. 9; 384/560, 571; 72/702
See application file for complete search history.

(56) References Cited

U.S. PATENT DOCUMENTS

| 1,493,598 | A | * | 5/1924 | Buckwalter | ........... | F16C 33/723 |
| | | | | | | 384/571 X |
| 1,668,105 | A | * | 5/1928 | Delaval-Crow | ......... | B23P 19/00 |
| | | | | | | 29/898.07 X |
| 4,050,130 | A | | 9/1977 | Pitner | | |
| 4,512,673 | A | * | 4/1985 | Condon, Jr. | ............. | F16C 19/26 |

(Continued)

FOREIGN PATENT DOCUMENTS

EP 1 783 387 A1 5/2007
JP A-11-148518 6/1999

OTHER PUBLICATIONS

Dec. 7, 2015 Search Report issued in European Patent Application No. 14172749.5.

*Primary Examiner* — Gregory Binda
(74) *Attorney, Agent, or Firm* — Oliff PLC

(57) ABSTRACT

A cross shaft joint includes a bearing cup, a cross shaft, and a joint yoke. The bearing cup includes a cylindrical portion in which an opening portion for receiving a shaft portion is formed in one end of the cylindrical portion in an axis direction, and a bottom portion that closes the other end of the cylindrical portion in the axis direction. The bearing cup is press-fitted into the fitting hole and supports the shaft portion through a rolling element so that the shaft portion is able to rotate. The bearing cup is fitted onto the shaft portion inside the fitting hole and holds the rolling element with the shaft portion. A diameter of an inner peripheral surface of the cylindrical portion is smaller on the opening portion side than the bottom portion side in a free state of the bearing cup before being press-fitted into the fitting hole.

2 Claims, 7 Drawing Sheets

(56) References Cited

U.S. PATENT DOCUMENTS

| | | | |
|---|---|---|---|
| 6,554,481 B2 * | 4/2003 | Ito | F04B 27/1063 384/560 X |
| 6,976,922 B2 * | 12/2005 | Smith | F16D 3/38 464/128 |
| 2002/0009248 A1 | 1/2002 | Ito | |
| 2007/0283564 A1 * | 12/2007 | Mizuno | F16D 3/385 29/898.07 |
| 2008/0248883 A1 * | 10/2008 | Ozaki | F16D 3/385 |
| 2011/0105236 A1 | 5/2011 | Daumal Castellon | |

* cited by examiner

FIG. 7

| SAMPLE NO. | 1 | 2 | 3 | 4 | 5 |
|---|---|---|---|---|---|
| SAMPLE SHAPE | RB2 RA2 | RB2 RA2 | RB2 RA2 | RB2 RA2 | RB2 RA2 |
| B-A VALUE | 0 | 15 | 21 | 22 | 24 |
| DETERMINATION | A | A | A | B | C |

A means a pass
B means a failure
C means a complete failure

BEARING CUP AND CROSS SHAFT JOINT

INCORPORATION BY REFERENCE

The disclosure of Japanese Patent Application No. 2013-127706 filed on Jun. 18, 2013 including the specification, drawings and abstract is incorporated herein by reference in its entirety.

BACKGROUND OF THE INVENTION

1. Field of the Invention

The invention relates to a bearing cup used for a cross shaft joint, and a cross shaft joint having the bearing cup.

2. Description of Related Art

For example, a universal joint described in Japanese Patent Application Publication No. 11-148518 (JP 11-148518 A) is structured by a first and second yokes, and a cross shaft that joins the yokes to each other so that the yokes are freely displaced. Circular holes are formed in each of the yokes, and bearing cups are fitted into and fixed to inner sides of the circular holes. The bearing cup is formed into a bottomed cylindrical shape having a cylindrical portion and a bottom portion that closes one end of the cylindrical portion. A shaft portion of the cross shaft is received by an inner side of the bearing cup, which is fitted into and fixed to the circular hole, from an opening of the other end of the cylindrical portion. A plurality of needles are provided between an inner peripheral surface of the bearing cup and an outer peripheral surface of the shaft portion of the cross shaft. As each of the needles rolls on a raceway formed by the inner peripheral surface of the bearing cup and the outer peripheral surface of the shaft portion of the cross shaft, the cross shaft and each of the yokes freely oscillate with each other.

SUMMARY OF THE INVENTION

When assembling the universal joint, the bearing cup is press-fitted to the circular hole of the yoke. In an assembled bearing cup, the bottom portion and the cylindrical portion on the bottom portion side are partially press-fitted to the circular hole, but a part of the cylindrical portion on the opening side could protrude from the circular hole. In this case, the inner peripheral surface of the bearing cup, which serves as the raceway for the needles, can have a constricted shape between the bottom portion and the opening, or a shape in which a diameter increases from the bottom portion towards the opening like a horn. Even if the inner peripheral surface of the bearing cup has such a shape, there is no problem in ordinary use. However, in a case where the shaft portion of the cross shaft is press-fitted to the opening of the bearing cup (to be precise, the needles on the inner peripheral surface) in order to eliminate backlash between the bearing cup and the needles (in a case where a so-called negative clearance is made), a situation can happen in which only a part of the inner peripheral surface of the bearing cup with a small inner diameter unevenly comes into contact with the needles (so-called a local contact situation). This excessively increases contact pressure between the inner peripheral surface of the bearing cup and the needles at the part of the bearing cup with a small inner diameter. This then causes an increase in friction between the inner peripheral surface of the bearing cup and the needles, and oscillating torque increases more than necessary when the cross shaft and the yoke oscillate with each other. In addition, it is difficult to improve durability around the bearing cup.

The invention provides a bearing cup and a cross shaft joint that are able to reduce friction between an inner peripheral surface of a bearing cup and a rolling element.

A bearing cup for a cross shaft joint according to an aspect of the invention includes a cross shaft having four shaft portions arranged in a cross shape, and a joint yoke having fitting holes into which the shaft portions are respectively fitted. The bearing cup includes a cylindrical portion, in which an opening portion for receiving the shaft portion is formed in one end of the cylindrical portion in an axis direction, and a bottom portion that closes the other end of the cylindrical portion in the axis direction. The bearing cup is press-fitted into the fitting hole and supports the shaft portion through a rolling element so that the shaft portion is able to rotate. The bearing cup is fitted onto the shaft portion inside the fitting hole and holds the rolling element with the shaft portion. A diameter of an inner peripheral surface of the cylindrical portion is smaller on the opening portion side than the bottom portion side in a free state of the bearing cup before being press-fitted into the fitting hole.

According to the above aspect, in the bearing cup in the free state before being press-fitted, the diameter of the inner peripheral surface of the cylindrical portion is smaller on the opening portion side than on the bottom portion side. Therefore, when the bearing cup is press-fitted to the fitting hole so that the opening portion side of the cylindrical portion protrudes from the fitting hole of the joint yoke, the diameter of the cylindrical portion on the opening portion side (a part that is not press-fitted into the fitting hole) is enlarged until the diameter of the inner peripheral surface of the cylindrical portion becomes generally the same on the bottom portion side and the opening portion side. Thus, the inner peripheral surface of the cylindrical portion becomes flat in the entire region in the axis direction. Accordingly, the inner peripheral surface of the cylindrical portion the rolling element are not locally in contact with each other, and are able to be in contact almost evenly in the entire region of the inner peripheral surface of the cylindrical portion in the axis direction. As a result, in the bearing cup, it is possible to reduce friction between the inner peripheral surface of the bearing cup and the rolling element.

In the above aspect, the diameter of the inner peripheral surface of the cylindrical portion may be gradually reduced from the bottom portion to the opening portion in the free state.

According to the above aspect, when the diameter of the inner peripheral surface of the cylindrical portion in the bearing cup in the free state is reduced gradually from the bottom portion to the opening portion, it is possible to ensure that the diameter of the inner peripheral surface of the cylindrical portion is generally the same on the bottom portion side and the opening portion side when the bearing cup is fitted into the fitting hole.

In the above aspect, in a state where the bearing cup is fitted into the fitting hole, a value obtained by subtracting the diameter of the inner peripheral surface on the bottom portion side from the diameter of the inner peripheral surface on the opening portion side may be 0 or more but not exceeding 21 μm.

According to the above aspect, in the bearing cup press-fitted into the fitting hole, when the value obtained by subtracting the diameter of the inner peripheral surface on the bottom portion side from the diameter of the inner peripheral surface on the opening portion side is 0 or more but not exceeding 21 μm, the diameter of the inner peripheral surface of the cylindrical portion is generally the same on the bottom portion side and the opening portion side. In this case, the inner peripheral surface of the cylindrical portion and the rolling element are not locally in contact with each other, and are able to be in contact with each other almost evenly in the entire region of the inner peripheral surface of the cylindrical portion in the axis direction.

In the above aspect, a part of an inner surface of the bottom portion of the bearing cup may be bulged towards an inner space of the cylindrical portion.

With the above structure, only the part of the inner surface of the bottom portion of the bearing cup, which is budged towards the inner space of the cylindrical portion, is in contact with an end surface of the distal end of the shaft portion. Therefore, sliding friction between the bottom portion and the shaft portion is reduced.

Also, a cross shaft joint may include a cross shaft having four shaft portions arranged into a cross shape, a joint yoke in which a fitting hole is formed, to which each of the shaft portions is fitted, and the bearing cup according the above aspect.

According to the above structure, in the cross shaft joint of the bearing cup, friction between the inner peripheral surface of the bearing cup and the rolling element is reduced.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 7 is a view showing determination results of shapes of the press-fitted bearing cup 24.

DETAILED DESCRIPTION OF EMBODIMENTS

Figure 1:
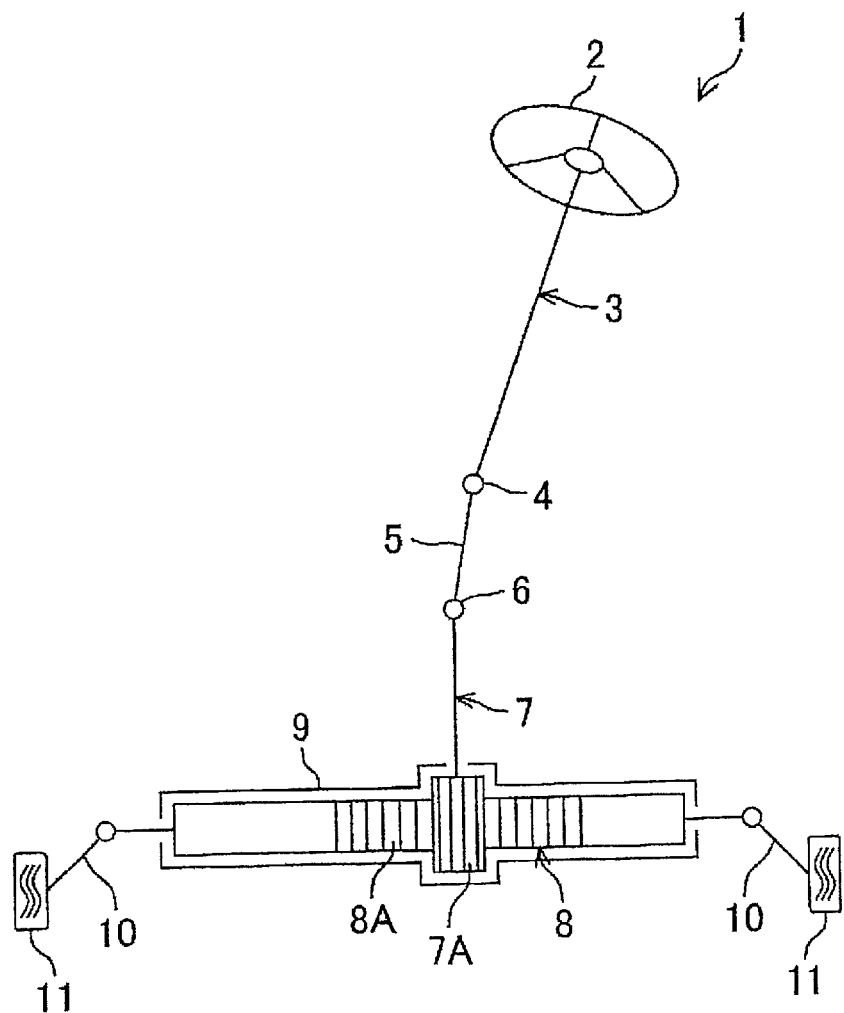
FIG. 1 is a schematic view showing a rough structure of a steering system 1 according to an embodiment of the invention.

A preferred embodiment of the invention is explained with reference to the attached drawings. FIG. 1 is a schematic view showing a rough structure of a steering system 1 according to an embodiment of the invention. With reference to FIG. 1, the steering system 1 according to this embodiment mainly includes a steering member 2, an input shaft 3, a universal joint 4, an intermediate shaft 5, a cross shaft joint 6, a pinion shaft 7, a rack bar 8, and a rack housing 9.

As the steering member 2, a steering wheel, for example, may be used. One end of the input shaft 3 is connected with the steering member 2. The other end of the input shaft 3 and one end of the intermediate shaft 5 are connected with each other by the universal joint 4. The other end of the intermediate shaft 5 and one end of the pinion shaft 7 are connected with each other by the cross shaft joint 6. In short, the intermediate shaft 5 is interposed between the input shaft 3 and the pinion shaft 7 and connects the input shaft 3 and the pinion shaft 7 with each other. The input shaft 3, the intermediate shaft 5, and the pinion shaft 7 are not present in the same straight line.

A pinion 7A is provided integrally in the other end of the pinion shaft 7. The rack bar 8 has a bar shape that is long in a vehicle width direction (in a left-right direction in FIG. 1). A rack 8A that meshes with the pinion 7A is formed in the rack bar 8, and the pinion shaft 7 and the rack bar 8 structure a rack and pinion mechanism. The rack housing 9 is a hollow body that is long in the vehicle width direction, and is fixed to a vehicle body (not shown). The rack bar 8 is inserted through the rack housing 9, and is supported by the rack housing 9 through a bearing and so on (not shown). In this state, the rack bar 8 is able to slide in the vehicle width direction. Both end portions of the rack bar 8 project to both outer sides of the rack housing 9, and a tie rod 10 is connected with each end portion of the rack bar 8. The tie rods 10 are connected with steered wheels 11 through knuckle arms (not shown).

Figure 2:
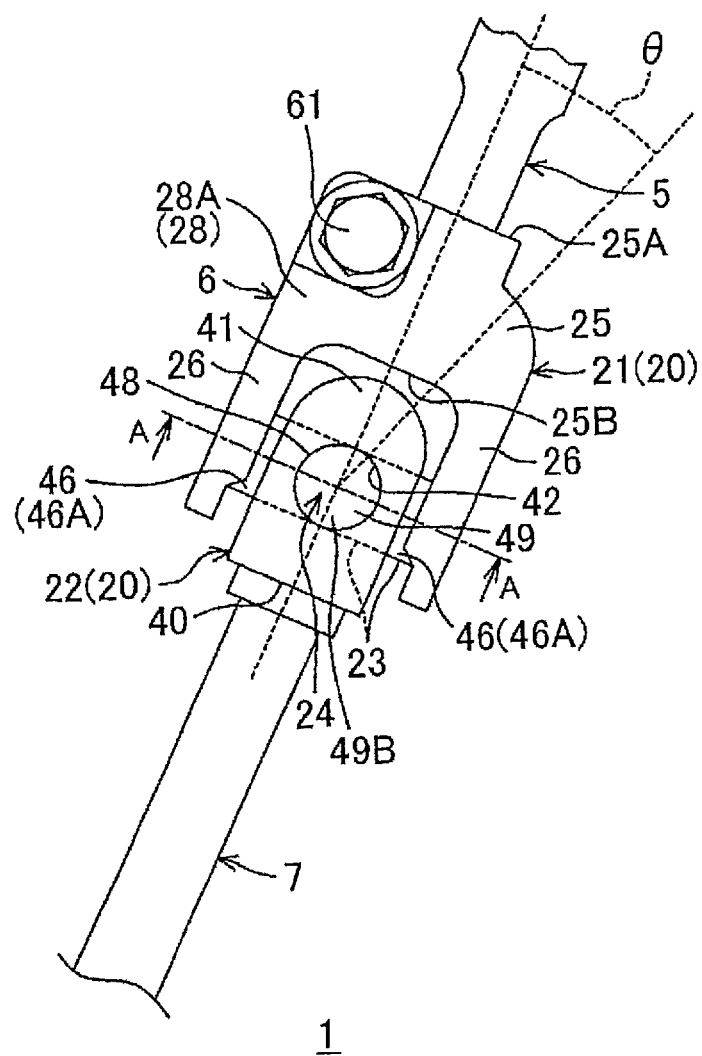
FIG. 2 is an extracted view showing a cross shaft joint 6 and a surrounding area of the cross shaft joint 6 in the steering system 1.
Figure 3:
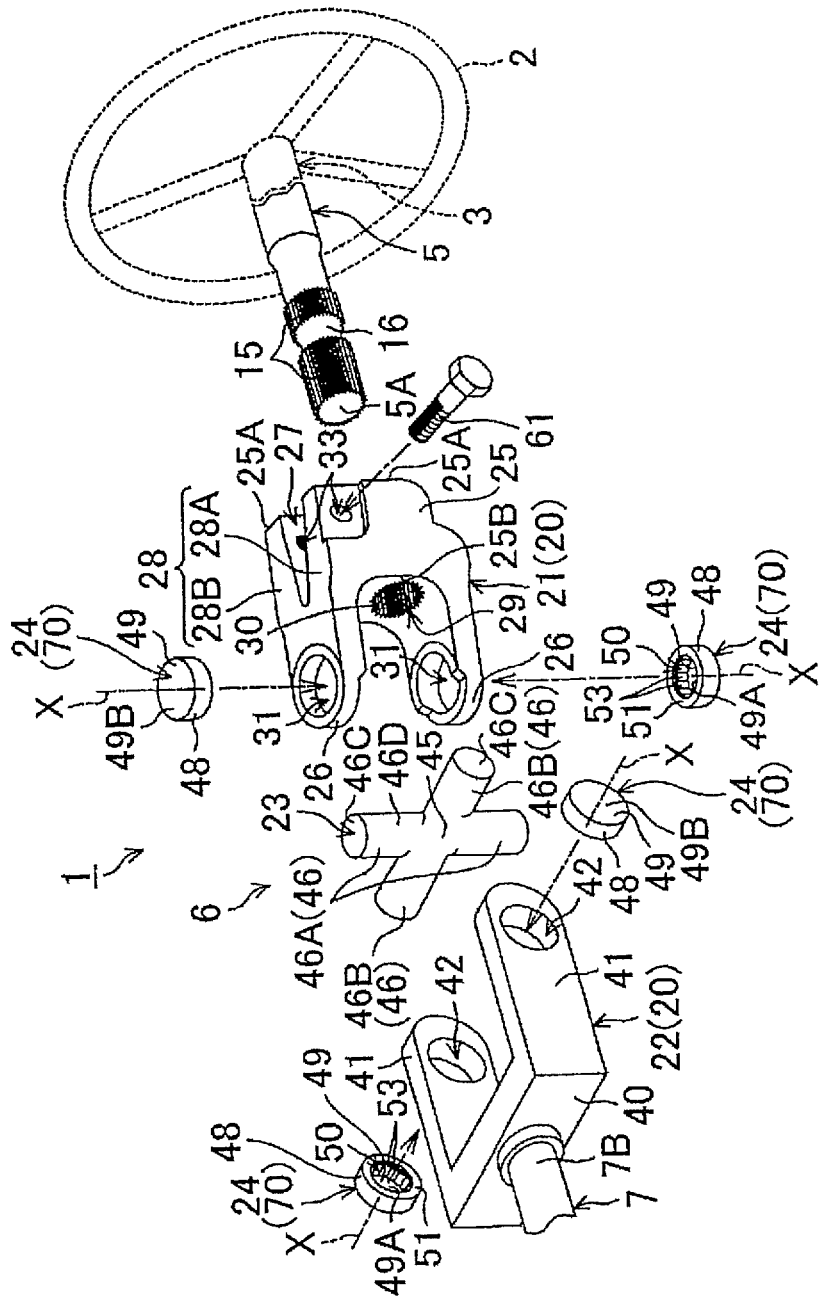
FIG. 3 is an exploded perspective view of the steering system 1 around the cross shaft joint 6.
Figure 4:
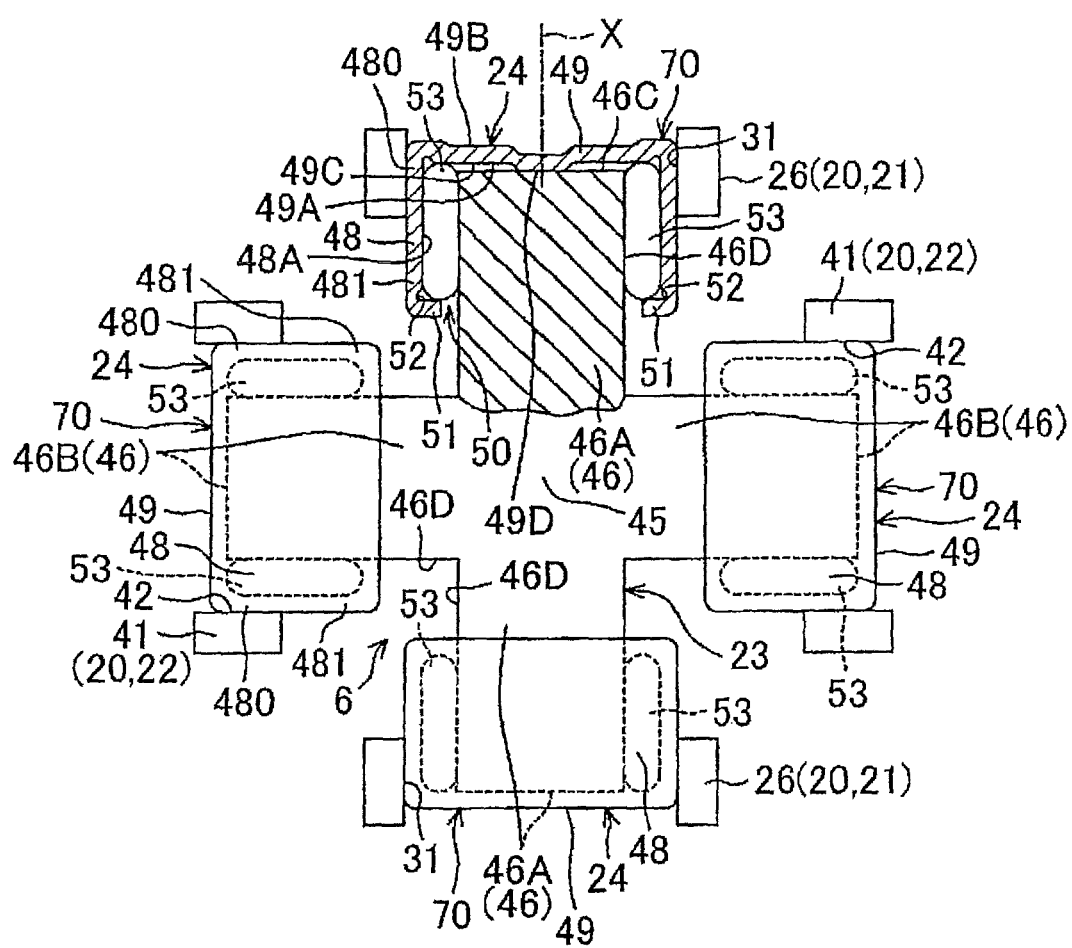
FIG. 4 is a sectional view taken along the line A-A in FIG. 2.

In the steering system 1, as the steering member 2 is steered and the input shaft 3 is rotated, the pinion shaft 7 rotates, and rotation of the pinion shaft 7 is converted into sliding (linear motion) of the rack bar 8 along the vehicle width direction by the pinion 7A and the rack 8A. Thus, steering of the steered wheels 11 on both sides of the rack bar 8 is achieved. FIG. 2 is an extracted view showing the cross shaft joint 6 and a surrounding area of the cross shaft joint 6 in the steering system 1. FIG. 3 is an exploded perspective view of the steering system 1 around the cross shaft joint 6. FIG. 4 is a sectional view taken along the line A-A in FIG. 2.

The cross shaft joint 6 and the surrounding area of the cross shaft joint 6 in the steering system 1 are explained in detail below. In FIG. 2, a part of the intermediate shaft 5, the entire cross shaft joint 6, and a part of the pinion shaft 7 are shown. With reference to FIG. 3, the intermediate shaft 5 is a thin and long metallic column, and an outer diameter of the intermediate shaft 5 is reduced and increased at arbitrary parts in an axis direction as necessary. In FIG. 3, the input shaft 3 and the steering member 2 are additionally shown by a broken line for convenience of explanation. In the intermediate shaft 5, serration 15 is formed on the entire circumference of an outer peripheral surface of an end portion 5A that is connected with the cross shaft joint 6. In the end portion 5A, a positioning groove 16 is formed. The positioning groove 16 has a circular shape that is recessed in a U shape and extends in a circumferential direction of the end portion 5A. The positioning groove 16 divides the serration 15 formed in the end portion 5A into two in an axis direction of the intermediate shaft 5.

The cross shaft joint 6 is provided with a pair of joint yokes 20, a cross shaft 23, and bearing cups 24. Herein below, of the pair of joint yokes 20, one of the yokes 20 (the joint yoke 20 on the right side in FIG. 3) will be sometimes referred to as a first joint yoke 21, and the other one (the joint yoke 20 on the left side in FIG. 3) will be sometimes referred to as a second joint yoke 22.

The first joint yoke 21 is formed by, for example, casting or forging of metal. The first joint yoke 21 integrally includes a base portion 25 near the intermediate shaft 5 in FIG. 3, a pair of arm portions 26, and a pair of flanges 28. The base portion 25 is a hollow body, and is generally cylindrical in this embodiment. In FIG. 3, a center axis of the generally cylindrical base portion 25 and the intermediate shaft 5 are positioned in the same straight line. A through hole 29 is formed in the base portion 25 at a position where the center axis of the base portion 25 passes. The through hole 29 is a round hole that passes through the base portion 25, and the through hole 29 structures a hollow portion of the base portion 25. A center axis (an axis) of the round through hole 29 and the center axis of the base portion 25 extend in parallel with each other. In the base portion 25, serration 30 is formed in the entire region of the inner peripheral surface that defines the through hole 29.

Each of the pair of arm portions 26 is shaped like a thin plate that is thin and long in the axis direction of the base portion 25, and is provided integrally with the base portion 25. The arm portions 26 are provided at positions, respectively, that are separated by 180° from one another in a circumferential direction in FIG. 3 in an end portion (a left end portion in FIG. 3) of the base portion 25 on the farther side of the intermediate shaft 5. The arm portions 26 extend towards a direction away from the base portion 25 (the left side in FIG. 3). Therefore, in a view of the first joint yoke 21 from a radially outer side of the base portion 25, the first joint yoke 21 is formed into a generally U shape. In the base portion 25, the through hole 29 is exposed at a position between the pair of arm portions 26. The pair of arm portions 26 extends in parallel with each other, and a fitting hole 31 is formed in each of the arm portions 26 at the same position in the length direction. The fitting hole 31 is a round hole that passes through the arm portion 26 in the radial direction of the base portion 25, and is formed in a distal end portion of the arm portion 26 away from the base portion 25.

A slit 27 is formed in the base portion 25. The slit 27 is made by cutting one location on the circumference of the base portion 25 from a one end 25A side (a right end side near the intermediate shaft 5 in FIG. 3) in the axis direction of the base portion 25. In this embodiment, the one location on the circumference is at the same position (or may not be the same position) as either one of the pair of arm portions 26 (the arm portion 26 on the upper side in FIG. 3) in the circumferential direction. The slit 27 extends along the through hole 29 (in other words, along the center axis of the base portion 25), and cuts the one location of the base portion 25 in the circumferential direction. Hence, the entire region of the slit 27 is communicated with the through hole 29. The slit 27 does not reach (is not communicated with) the fitting holes 31 of the arm portions 26, which are located at the same positions in the circumferential direction. Relating to the one end 25A, a reference numeral 25B is used for the other end of the base portion 25. The arm portions 26 extend from the other end 25B.

The pair of flanges 28 is portions necessarily formed due to formation of the slit 27 in the base portion 25. In other words, the pair of flanges 28 are portions on both sides of the base portion 25, which face each other through the slit 27. The pair of flanges 28 are shaped like plates extending in parallel with each other along the axis direction of the base portion 25. Herein below, one of the pair of flanges 28 (on the front side in FIG. 3) will be sometimes referred to as a flange 28A, and the other one will be sometimes distinguished as a flange 28B. A bolt hole 33 is formed in each of the flanges 28. Each of the bolt holes 33 extends in an orthogonal direction (a direction in which the pair of flanges 28 face each other) orthogonal to a direction in which the through hole 29 extends (an axis direction of the through hole 29).

The second joint yoke 22 is made of metal, and is formed by casting or forging similarly to the first joint yoke 21. The second joint yoke 22 includes a base portion 40 and a pair of arm portions 41. The base portion 40 has a bar shape extending in a direction orthogonal to the pinion shaft 7. The arm portions 41 are respectively provided on both end portions of the base portion 40 in the longitudinal direction, and have a plate shape extending in a direction orthogonal to the base portion 40 (on the first joint yoke 21 side in FIG. 3). The pair of arm portions 41 extends in parallel with each other, and fitting holes 42 are formed at the same positions in the length direction of the armnn portions 41. The fitting hole 42 is a round hole that passes through the arm portion 41 in the longitudinal direction of the base portion 40, and is formed in a distal end portion of the arm portion 41 away from the base portion 40. The size of the fitting hole 42 of the second joint yoke 22 is the same as the size of the fitting hole 31 of the first joint yoke 21.

The cross shaft 23 is formed by, for example, metal casting and machining of a metal lump. Distal ends of the cross shaft 23 may be chamfered or partially tapered if necessary. The cross shaft 23 integrally includes a block-like center portion 45 that forms generally a cube approximating a spherical body, and four shaft portions 46 radially extending from the center portion 45. Each of the shaft portions 46 has a columnar shape. Of the four shaft portions 46, a pair of shaft portions 46A is located in the same straight line, and the remaining pair of shaft portions 46B is located in the same straight line extending in a direction orthogonal to the shaft portions 46A. Thus, the four shaft portions 46 are arranged like a cross. In each of the shaft portions 46, a part connected with the center portion 45 is a root portion, and a part that is farthest from the center portion 45 is a distal end portion. In FIG. 3, an end surface 46C of the distal end portion of each of the shaft portions 46 is flat along a direction orthogonal to an axis direction of the shaft portion 46 (a direction in which the shaft portion 46 extends).

The bearing cup 24 has a bottomed cylindrical shape, and is formed of metal. There are four bearing cups 24 in total for the entire cross shaft joint 6 according to the fitting holes 31 of the two arm portions 26 of the first joint yoke 21 and the fitting holes 42 of the two arm portions 41 of the second joint yoke 22. Each of the bearing cups 24 integrally includes a cylindrical portion 48 and a bottom portion 49. The cylindrical portion 48 has a cylindrical shape. A circular opening portion 50, by which an inner space of the cylindrical portion 48 is exposed, is formed in one end of the cylindrical portion 48 in an axis direction X of the cylindrical portion 48. The one end of the cylindrical portion 48 is bent at a generally right angle across the entire circumference to a center side of a circle (a radially inner side) of the cylindrical portion 48, thereby forming a circular flange 51. A region defined by an inner peripheral edge of the flange 51 is the opening portion 50.

With reference to the bearing cup 24 located at the uppermost position in FIG. 4 (a part with hatching), a groove 52 is formed in an end portion of an inner peripheral surface 48A of the cylindrical portion 48 on the opening portion 50 side. The bottom portion 49 has a disc shape that forms a bottom of the bearing cup 24, and closes the other end of the cylindrical portion 48 in the axis direction X (the end on the opposite side of the opening portion 50). In the bottom portion 49, a surface facing the inner space of the cylindrical portion 48 is referred to as an inner surface 49A, and a surface on the opposite side of the inner surface 49A is referred to as an outer surface 49B. By recessing the outer surface 49B in two stages to the inner surface 49A side, a first projecting surface 49C and a second projecting surface 49D are formed in the inner surface 49A. The first projecting surface 49C has a circular shape having a slightly smaller diameter than that of the bottom portion 49, and is bulged to the inner space of the cylindrical portion 48. The second projecting surface 49D has a circular shape having a smaller diameter than that of the first projecting surface 49C, and is further bulged at a center of a circle of the first projecting surface 49C towards the inner space of the cylindrical portion 48.

A plurality of needle-shaped rolling elements 53 (including those with crowning where necessary) extending along the axis direction X are arranged on the inner peripheral surface 48A of the cylindrical portion 48. The rolling elements 53 are lined up in a circumferential direction of the inner peripheral surface 48A, and form a circular shape as a whole. Each of the rolling elements 53 is sandwiched between the flange 51 and an outer peripheral part of the first projecting surface 49C in the axis direction X, and is thus held so as not to come off from the cylindrical portion 48. The bearing cup 24, and the rolling elements 53 held in the bearing cup 24 structure a bearing assembly 70.

Steps of connecting the intermediate shaft 5 and the pinion shaft 7 with each other while assembling the above-mentioned cross shaft joint 6 are explained. With reference to FIG. 3, of the pair of shaft portions 46A in the cross shaft 23, one of the shaft portions 46 is first fitted into the fitting hole 31 of one of the arm portions 26 from between the pair of arm portions 26, and the other shaft portion 46 is fitted into the fitting hole 31 of the other arm portion 26 from between the pair of arm portions 26. In short, in the first joint yoke 21, one of the shaft portions 46 (46A) is fitted into each of the fitting holes 31.

Then, the bearing cup 24 is brought to face the fitting hole 31 of each of the arm portions 26 from the outer side. At that time, the opening portion 50 of the bearing cup 24 first faces the fitting hole 31. In this state, the bearing cup 24 is brought closer to the fitting hole 31 and fitted into the fitting hole 31. At that time, the bearing cup 24 is press-fitted into the fitting hole 31. As the bearing cup 24 is press-fitted into the fitting hole 31, the corresponding shaft portion 46A (fitted into the fitting hole 31) is received by the opening portion 50 of the cylindrical portion 48 of the bearing cup 24 and inserted into the cylindrical portion 48 from the opening portion 50.

As shown in FIG. 4, in a state where press-fitting of the bearing cup 24 is completed, the corresponding shaft portion 46A is inserted to the inner side of the bearing cup 24 (to be precise, an inner side of the plurality of rolling elements 53 arranged circularly) that is fitted into each of the fitting holes 31. The circularly arranged plurality of rolling elements 53 are placed between an outer peripheral surface 46D of each of the shaft portions 46A and the inner peripheral surface 48A of the cylindrical portion 48 of the bearing cup 24 so that the rolling elements 53 are able to roll. The outer peripheral surface 46D of the shaft portion 46A and the inner peripheral surface 48A of the cylindrical portion 48 serve as a raceway for the rolling elements 53.

As stated above, the cylindrical portion 48 is fitted onto the shaft portion 46A inside the fitting hole 31 and holds the rolling elements 53 with the shaft portion 46A. Therefore, each of the shaft portions 46A of the cross shaft 23 is supported by the bearing cup 24 of each of the arm portions 26 of the first joint yoke 21 through the rolling elements 53 so that the shaft portions 46A are able to rotate. In the state where press-fitting of the bearing cup 24 is completed, a part of the cylindrical portion 48 of the bearing cup 24 fitted into each of the fitting holes 31, on the bottom portion 49 side (referred to as a bottom side portion 480), is accommodated in the fitting hole 31 entirely in the circumferential direction. However, a part of the cylindrical portion 48 on the opening portion 50 side (referred to as an "opening side portion 481") protrudes from the fitting hole 31 to the side of the center portion 45 of the cross shaft 23 entirely in the circumferential direction. In short, the bearing cup 24 is partially press-fitted to the fitting hole 31 only in the bottom side portion 480.

With reference to FIG. 3, in the same steps as those of the first joint yoke 21, one of the shaft portions 46 of the remaining pair of shaft portions 46B of the cross shaft 23 is fitted into the fitting hole 42 of one of the arm portions 41 from between the pair of arm portions 41, and the other shaft portion 46 is fitted into the fitting hole 42 of the other arm portion 41 from between the pair of arm portions 41. In short, in the second joint yoke 22, one of the shaft portions 46 is fitted into each of the fitting holes 42.

Then, in the same steps as those of the first joint yoke 21, the bearing cup 24 is fitted into the fitting hole 42 of each of the arm portions 41 by press fitting. As the bearing cup 24 is press-fitted into the fitting hole 42, the corresponding shaft portion 46B (fitted into the fitting hole 42) is received by the opening portion 50 of the cylindrical portion 48 of the bearing cup 24, and inserted into the cylindrical portion 48 from the opening portion 50. In the state where press-fitting of the bearing cup 24 is completed, the corresponding shaft portion 46B is inserted to the inner side of the bearing cup 24 fitted into each of the fitting holes 42 (to be precise, the inner side of the plurality of rolling elements 53 arranged circularly along the inner peripheral surface 48A of the cylindrical portion 48). The plurality of circularly arranged rolling elements 53 are placed between the outer peripheral surface 46D of each of the shaft portions 46B and the inner peripheral surface 48A of the cylindrical portion 48 of the bearing cup 24 so that the rolling elements 53 are able to roll. The outer peripheral surface 46D of the shaft portion 46B and the inner peripheral surface 48A of the cylindrical portion 48 form a raceway for the rolling elements 53. As stated above, the cylindrical portion 48 is fitted onto the shaft portion 46B inside the fitting hole 42 and holds the rolling elements 53 with the shaft portion 46B. Therefore, as shown in FIG. 4, each of the shaft portions 46B of the cross shaft 23 is supported by the bearing cup 24 of each of the arm portions 41 of the second joint yoke 22 through the rolling elements 53 so that the shaft portions 46B are able to rotate.

In a state where press-fitting of the bearing cup 24 is completed, the foregoing bottom side portion 480 in the cylindrical portion 48 of the bearing cup 24 fitted into each of the fitting holes 42 is accommodated in the fitting hole 42 entirely in the circumferential direction. However, the foregoing opening side portion 481 in the cylindrical portion 48 protrudes from the fitting hole 42 entirely in the circumferential direction to the side of the center portion 45 of the cross shaft 23. In short, in the second joint yoke 22, the bearing cup 24 is also partially press-fitted into the fitting hole 42 only in the bottom side portion 480.

When press-fitting of the bearing cups 24 into the fitting holes 31 and 42 is completed as stated above, the cross shaft joint 6 is completed. In the inner surface 49A of the bottom portion 49 of each of the bearing cups 24, only the second projecting surface 49D positioned in the center of the circle is in contact with the end surface 46C of the distal end of the shaft portion 46. Therefore, sliding friction between the bottom portion 49 and the shaft portion 46 is reduced. As stated earlier, the bearing cup 24 is partially press-fitted into each of the fitting holes 31 and 42. Therefore, in the cylindrical portion 48 of the bearing cup 24, the bottom side portion 480 press-fitted into each of the fitting holes 31 and 42 receives pressure from the joint yoke 20, while almost no pressure from the joint yoke 20 acts on the opening side portion 481 protruding from each of the fitting holes 31 and 42. Thus, in the press-fitted bearing cup 24, the opening side portion 481 is deformed to expand the diameter. The entire shape of the cylindrical portion 48 with the opening side portion 481 having the expanded diameter has a constricted shape around a boundary between the opening side portion 481 and the bottom side portion 480, or a shape in which the diameter expands from the bottom portion 49 towards the opening portion 50 like a horn.

In a state where the cylindrical portion 48 has such a shape, each of the shaft portions 46 of the cross shaft 23 is sometimes press-fitted to the inner side of the bearing cup 24 (the inner side of the plurality of rolling elements 53 arranged circularly) in order to eliminate backlash around the bearing cup 24 and the rolling elements 53. In such a case, since a diameter of the shaft portion 46 is larger than a diameter of the inscribed circle with respect to the plurality of rolling elements 53, a so-called negative clearance is made when the shaft portion 46 is press-fitted to the inner side of the bearing cup 24. In a state where the negative clearance is made, only a part of the inner peripheral surface 48A of the cylindrical portion 48 with the smallest diameter is in contact with each of the rolling elements 53. When the inner peripheral surface 48A is in local contact with each of the rolling elements 53 as described above, surface pressure (friction) between the inner peripheral surface 48A and each of the rolling elements 53 is increased, and oscillating torque is thus increased when the cross shaft 23 and the joint yoke 20 are oscillated with one another.

Figure 5:
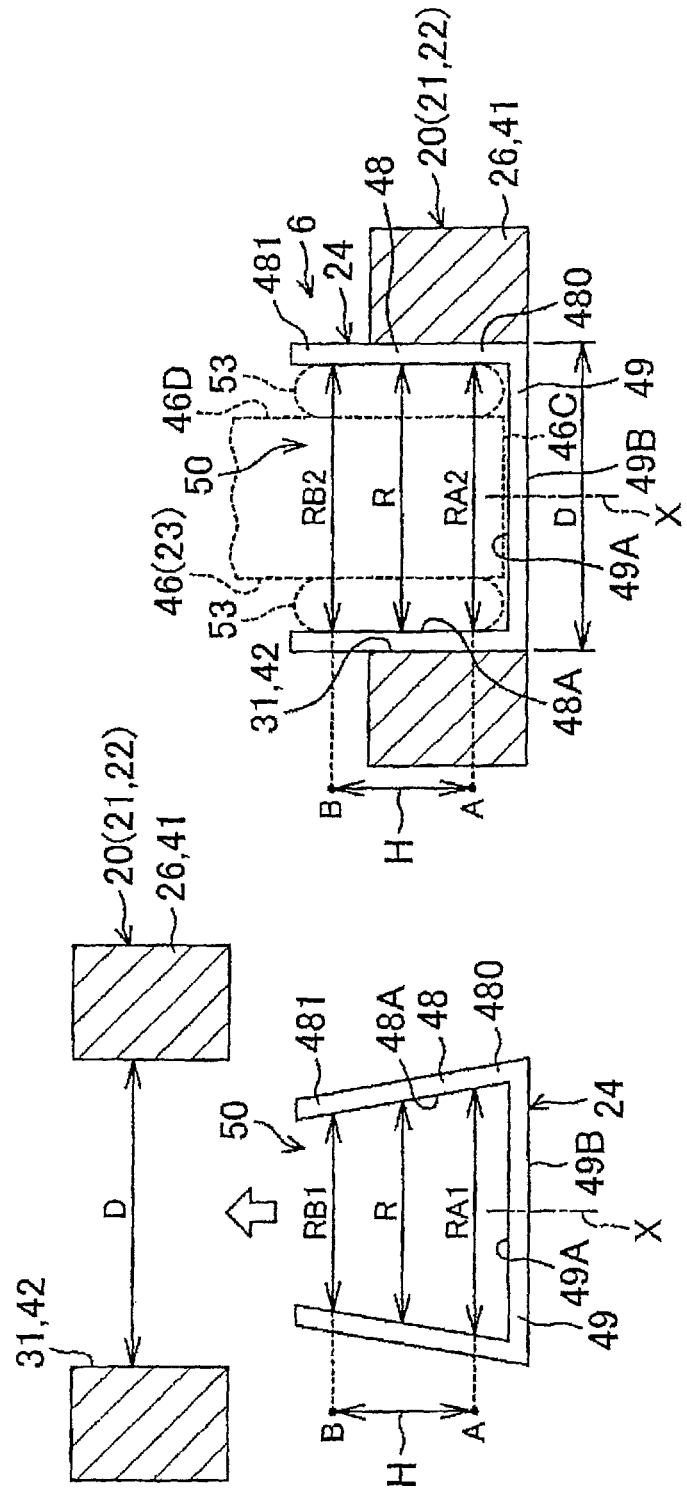
FIG. 5A is a schematic view of a bearing cup 24 and a surrounding area of the bearing cup 24 in a free state before being press-fitted into a joint yoke 20.
FIG. 5B is a schematic view of the bearing cup 24 press-fitted into the joint yoke 20, and a surrounding area of the bearing cup 24.

Therefore, the bearing cup 24 in a free state before being press-fitted into each of the fitting holes 31, 42 has a shape that takes into consideration deformation due to press-fitting (especially an deformation amount of the opening side portion 481). FIG. 5A is a schematic view of the bearing cup 24 and a surrounding area of the bearing cup 24 in a free state before being press-fitted into the joint yoke 20, and FIG. 5B is a schematic view of the bearing cup 24 press-fitted into the joint yoke 20, and a surrounding area of the bearing cup 24. Illustration of the foregoing flange 51 (see FIG. 3) is omitted in the bearing cup 24 in FIG. 5A and FIG. 5B.

Prior to specific explanation, in the cylindrical portion 48 shown in FIG. 5A, two positions A, B are determined in the axis direction X of the cylindrical portion 48. In the axis direction X, the position A is any part of the bottom side portion 480, and the position B is any part of the opening side portion 481. There is a given height (interval) between the position A and the position B in the axis direction X. The height H in this embodiment is between 4 and 6 mm. In the bearing cup 24 in the free state, a diameter R of the inner peripheral surface 48A at the position A is referred to as a diameter RA1, and a diameter R of the inner peripheral surface 48A at the position B is referred to as a diameter RB1. The diameter RB1 is set to be smaller than the diameter RA1.

The bearing cup 24 stated above is press-fitted into the each of the fitting holes 31, 42 as shown by an outlined arrow in FIG. 5A. In the press-fitted bearing cup 24 shown in FIG. 5B, a diameter R of the inner peripheral surface 48A at a position A (the same position as the position A before press-fitting) is referred to as a diameter RA2, and a diameter R of the inner peripheral surface 48A at a position B (the same position as the position B before press-fitting) is referred to as the diameter RB2. As stated earlier, in the press-fitted bearing cup 24, the opening side portion 481 is deformed so as to expand the diameter. However, in the bearing cup 24 in the free state, since the diameter RB1 is set to be smaller than the diameter RA1 (see FIG. 5A), the diameter RB2 becomes generally the same as the diameter RA2 when the diameter of the opening side portion 481 expands after press-fitting.

As stated so far, in the bearing cup 24 in the free state before press-fitting, the diameter R of the inner peripheral surface 48A of the cylindrical portion 48 on the bottom portion 49 side is smaller than that on the opening portion 50 side as shown in FIG. 5A. Therefore, as shown in FIG. 5B, when the bearing cup 24 is press-fitted into each of the fitting holes 31, 42 so that the cylindrical portion 48 on the opening portion 50 side protrudes from each of the fitting holes 31, 42 of the joint yoke 20, the diameter of the cylindrical portion 48 of the opening portion 50 side (the opening side portion 481 that is not press-fitted into each of the fitting holed 31, 42) is expanded until the diameters R of the inner peripheral surface 48A of the cylindrical portion 48 become generally the same on the bottom portion 49 side and the opening portion 50 side. Accordingly, the inner peripheral surface 48A that serves as the raceway for the rolling elements 53 in the cylindrical portion 48 becomes flat across the entire region in the axis direction X (straight along the axis direction X). Hence, even in a state where a negative clearance is made, the inner peripheral surface 48A of the cylindrical portion 48 and the rolling elements 53 are not in local contact with each other, and are able to be in contact with each other almost evenly in the entire region of the inner peripheral surface 48A of the cylindrical portion 48 in the axis direction X. As a result, in the bearing cup 24, it is possible to reduce surface pressure (friction) between the inner peripheral surface 48A of the bearing cup 24 and the rolling elements 53. This makes it possible to stabilize oscillating torque at a low value when the cross shaft 23 and the joint yoke 20 are oscillated with one another. Thus, it is also possible to improve durability of the bearing cup 24, the rolling elements 53, and the joint yoke 20. Moreover, by reducing surface pressure between the inner peripheral surface 48A of the bearing cup 24 and the rolling elements 53, it is possible to expand (set moderately) dimensional tolerance (for example, tolerance of pore diameters of the fitting holes 31, 42 and so on) that affects assembly of the bearing cup 24 to the joint yoke 20.

As shown in FIG. 5A, it is preferred that the diameter R of the inner peripheral surface 48A of the cylindrical portion 48 in the bearing cup 24 in the free state is gradually reduced from the bottom portion 49 towards the opening portion 50. Thus, when the bearing cup 24 is press-fitted into each of the fitting holes 31, 42, it is ensured that the diameter R of the inner peripheral surface 48A of the cylindrical portion 48 becomes generally the same on the bottom portion 49 side and the opening portion 50 side as shown in FIG. 5B.

Figure 6:
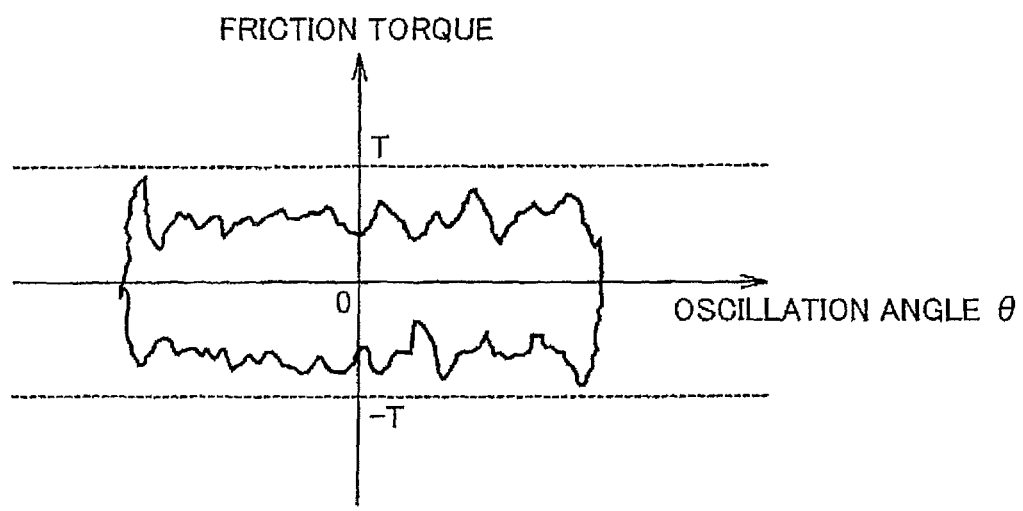
FIG. 6 is a graph showing a relation between an oscillation angle θ of the joint yoke 20 and friction torque generated in the joint yoke 20 in a case where the joint yoke 20 is oscillated.

Although it is preferred that the diameter RB2 and the diameter RA2 are completely the same (with no difference), there is no problem even if the diameter RB2 is slightly larger than the diameter RA2. The reason is explained with reference to the graph shown in FIG. 6. One of the joint yokes 20 in the cross shaft joint 6 was oscillated about the shaft portion 46 (of the cross shaft 23) inserted in the fitting hole 31 or 42 of the joint yoke 20, and an oscillation angle θ (see FIG. 2) and oscillating torque of the joint yoke 20 were measured. The oscillating torque corresponds to friction between the inner peripheral surface 48A of the bearing cup 24 and the rolling elements 53, and may also be referred to as friction torque. Measurement conditions were an oscillation angle θ of about 0~±45° and oscillation speed of the joint yoke 20 of 0.5~15 rpm (fixed at 2.8 rpm herein).

As stated earlier, the diameter RA2 and the diameter RB2 are main dimensions of the bearing cup 24 that is press-fitted into each of the fitting holes 31, 42 (see FIG. 5B). A plurality of types of samples of the bearing cups 24 were prepared, in which values obtained by subtracting the diameter RA2 from the diameter RB2 (referred to as a "B−A value") are different from each other. The oscillating torque (friction torque) in each of the samples was measured at different oscillation angles θ stated above. Then, it was confirmed whether or not the measurement value of the oscillating torque in each of the samples was within a range (a region sandwiched by two broken lines in FIG. 6) of target oscillating torque T (±0.1 Nm or more but not exceeding 0.4 Nm; ±0.1 Nm herein).

As a result of a plurality of measurements of the samples, it was determined that, in any of the measurement results, the sample with the measurement value of oscillating torque within the target oscillating torque T was expressed as A (A means a pass). As for the sample with the measurement value of the oscillating torque that failed to be within the target oscillating torque T at least once, the sample was determined as B (B means a failure). In any of the measurement results, the sample with the measurement value of oscillating torque that fails to be within the target torque T was determined as C (C means a complete failure).

Determination results for all of the samples are shown in FIG. 7. According to FIG. 7, all of the samples with the B−A value of 21 μm or smaller were pass (a pass rate was 99.3% or higher). Thus, in the bearing cup 24 press-fitted into each of the fitting holes 31, 42, the value obtained by subtracting the diameter RA2 of the inner peripheral surface 48A on the bottom portion 49 side from the diameter RB2 of the inner peripheral surface 48A on the opening portion 50 side (the B−A value) needs to be 0 or more but not exceeding 21 nm.

Then, in the bearing cup 24 press-fitted into each of the fitting holes 31, 42, the diameter R of the inner peripheral surface 48A of the cylindrical portion 48 becomes generally the same on the bottom portion 49 side and the opening portion 50 side as shown in FIG. 5B. In this case, the inner peripheral surface 48A of the cylindrical portion 48 and the rolling elements 53 are not in local contact with each other, and are able to be in contact with each other almost evenly in the entire region of the inner peripheral surface 48A of the cylindrical portion 48 in the axis direction X.

Values that need to be set for the foregoing diameter RA1 and diameter RB1 of the bearing cup 24 in the free state before press-fitting in order to have the B−A value of 0 or more but not exceeding 21 μm are explained. With reference to FIG. 5A and FIG. 5B, a pore diameter (a diameter) of the fitting holes 31, 42 of the joint yoke 20 before press-fitting the bearing cup 24 is D. Next, a coefficient of contraction of the bearing cup 24 at each of the positions A, B is determined. The coefficient of contraction is a coefficient that expresses how much the cylindrical portion 48 is contracted at each of the positions A and B when the state of the bearing cup 24 is changed from the free state to the press-fitted state. As described earlier, since the bearing cup 24 is partially press-fitted, a coefficient of contraction α at the position A and a coefficient of contraction β at the position B are different from each other.

Defining the coefficients of contraction α and β by using D, RA1, RB1, RA2, and RB2 stated so far results in equations (1) and (2).

$$\alpha = (RA1 - RA2)/(RA1 - D) \quad \text{equation (1)}$$

$$\beta = (RB1 - RB2)/(RB1 - D) \quad \text{equation (2)}$$

Instead of defining α and β by the equations (1) and (2), α and β may be experimental values obtained in advance from experiments.

Since the B−A value is 0 or more but not exceeding 21 μm, the following equation (3) holds.

$$0 \leq RB2 - RA2 \leq 21 \text{ μm} \quad \text{equation (3)}$$

By substituting the equations (1) and (2) into the equation (3), the next equation (4) is obtained, and equations (5) and (6) are obtained from the equation (4).

$$0 \leq RB1(1-\beta) - RA1(1-\alpha) - D(\alpha-\beta) \leq 21 \text{ μm} \quad \text{equation (4)}$$

$$RA1 \leq (RB1(1-\beta) - D(\alpha-\beta))/(1-\alpha) \quad \text{equation (5)}$$

$$RA1 \geq (RB1(1-\beta) - D(\alpha-\beta) - 21)/(1-\alpha) \quad \text{equation (6)}$$

The diameter RA1 and the diameter RB1 may be set based on the equations (5) and (6).

In the cross shaft joint 6 completed as described above, the end portion 5A of the intermediate shaft 5 is inserted into the through hole 29 of the first joint yoke 21 from the one end 25A side of the base portion 25 as shown in FIG. 3. The inserted intermediate shaft 5 is concentric with the through hole 29, and the serration 15 of the end portion 5A in the intermediate shaft 5 meshes with the serration 30 of the through hole 29 of the base portion 25. In short, the base portion 25 is serration-fitted to the intermediate shaft 5 inserted into the through hole 29. At this time, the positioning groove 16 of the end portion 5A is at the same position as the bolt hole 33 of each of the flanges 28 of the first joint yoke 21 in the axis direction of the intermediate shaft 5.

Next, as the bolt 61 is screwed into the flange 28, and the bolt 61 is fitted into the positioning groove 16 of the end portion 5A of the intermediate shaft 5 and then passed through the bolt hole 33 of the flange 28B. Thus, the intermediate shaft 5 is positioned in the axis direction, and does not come off from the through hole 29 of the base portion 25. Accordingly, connection of the intermediate shaft 5 with the cross shaft joint 6 is completed (see FIG. 2).

With reference to FIG. 3, a one end portion 7B of the metallic pinion shaft 7 is connected with a center part in a longitudinal direction of the base portion 40 of the second joint yoke 22. The second joint yoke 22 and the pinion shaft 7 may be serration-fitted to each other similarly to the case of the first joint yoke 21, or screw-fitted with each other. Accordingly, connection of the pinion shaft 7 with the cross shaft joint 6 is completed. The second joint yoke 22 and the pinion shaft 7 may be an integrally molded object from the beginning instead of being connected with each other by serration-fitting or screw-fitting.

The intermediate shaft 5 may be connected with the first joint yoke 21 and the pinion shaft 7 may be connected with the second joint yoke 22 before the cross shaft 23 is assembled to the first joint yoke 21 and the second joint yoke 22. With reference to FIG. 1, the universal joint 4 may have the same structure as the cross shaft joint 6 (the first joint yoke 21, the second joint yoke 22, the cross shaft 23, and the bearing cup 24).

In the state described above where the intermediate shaft 5 and the pinion shaft 7 are connected with the cross shaft joint 6, and the input shaft 3 and the intermediate shaft 5 are connected with the universal joint 4, the steering member 2 is operated to rotate in a given direction. Then, the input shaft 3 rotates together with the steering member 2, steering torque of the steering member 2 is transmitted to the intermediate shaft 5 through the universal joint 4, and the intermediate shaft 5 rotates in the same direction as the steering member 2. Thus, with reference to FIG. 3, the first joint yoke 21 of the cross shaft joint 6 connected with the intermediate shaft 5 rotates in the same direction as the steering member 2. In synchronization with rotation of the first joint yoke 21, the pair of shaft portions 46A supported by the pair of arm portions 26 of the first joint yoke 21 in the cross shaft 23 rotates about the center portion 45. This causes the whole cross shaft 23 to rotate in the same direction as the steering member 2 about the center portion 45, and the second joint yoke 22 that supports the pair of shaft portions 46B of the cross shaft 23 rotates in the same direction as the cross shaft 23, in other words, in the same direction as the steering member 2, and the pinion shaft 7 rotates integrally with the second joint yoke 22.

The intermediate shaft 5 and the pinion shaft 7 are not in the same straight line (see FIG. 1) as stated earlier. Therefore, to be precise, the cross shaft 23 rotates three-dimensionally in which the intermediate shaft 5 and the pinion shaft 7 serve as centers of rotation, respectively. Thus, with reference to FIG. 1, in the steering system 1, steering torque of the steering member 2 is transmitted by the universal joint 4 to the intermediate shaft 5 from the input shaft 3, and further transmitted to the pinion shaft 7 from the intermediate shaft 5 by the cross shaft joint 6, thereby rotating the pinion shaft 7. As a result, in the steering system 1, the rack bar 8 slides along with rotation of the pinion shaft 7, and each of the steered wheels 11 is steered.

The invention is not limited to the embodiment explained so far, and various changes may be made without departing from the scope of the claims. For example, in the cross shaft joint 6 shown in FIG. 3, the structure of the second joint yoke 22 may be the same as the first joint yoke 21. The cross shaft joint 6 may be applicable to any type of device, other than the steering system 1, in which two shafts, which are not present in the straight line, are connected with each other.

What is claimed is:

1. A bearing cup of a cross shaft joint, the cross shaft joint including a cross shaft having four shaft portions arranged in a cross shape; and a joint yoke having fitting holes into which the four shaft portions are respectively fitted, the bearing cup comprising:
    a cylindrical portion, in which an opening portion for receiving a shaft portion of the four shaft portions is formed in one end of the cylindrical portion in an axis direction; and
    a bottom portion that closes the other end of the cylindrical portion in the axis direction, wherein
    the bearing cup is adapted to be press-fitted into the fitting hole and supports the shaft portion through a rolling element so that the shaft portion is able to rotate,
    the bearing cup is adapted to be fitted onto the shaft portion inside the fitting hole and adapted to hold the rolling element with the shaft portion,
    a radial direction diameter of an inner peripheral surface of the cylindrical portion is smaller on the opening portion side than the bottom portion side in a free state of the bearing cup before being press-fitted into the fitting hole, and
    the diameter of the inner peripheral surface of the cylindrical portion is gradually reduced from the bottom portion to the opening portion in the free state.

2. The bearing cup according to claim 1, wherein a part of an inner surface of the bottom portion is bulged towards an inner space of the cylindrical portion.

\* \* \* \* \*